United States Patent [19]

Troupes et al.

[11] Patent Number: 4,703,323
[45] Date of Patent: Oct. 27, 1987

[54] METHOD AND APPARATUS FOR DISPLAYING ENHANCED DOT MATRIX CHARACTERS

[75] Inventors: Demetrios Troupes; Randall W. Alexander, both of Charlotte, N.C.

[73] Assignee: International Business Machines Corporation, Armonk, N.Y.

[21] Appl. No.: 752,165

[22] Filed: Jul. 3, 1985

Related U.S. Application Data

[63] Continuation-in-part of Ser. No. 695,997, Jan. 29, 1985, Pat. No. 4,586,835, which is a continuation-in-part of Ser. No. 602,248, Apr. 20, 1984, abandoned.

[51] Int. Cl.⁴ .............................................. G09G 3/00
[52] U.S. Cl. .................................... 340/790; 340/723; 340/728; 340/735
[58] Field of Search ............... 340/728, 723, 731, 735, 340/790; 400/121, 124

[56] References Cited

U.S. PATENT DOCUMENTS

| | | |
|---|---|---|
| 3,182,308 | 5/1965 | Dutton et al. .......................... 343/5 |
| 3,546,681 | 12/1970 | Korn et al. . |
| 3,588,872 | 6/1971 | Kolb et al. . |
| 3,868,673 | 2/1975 | Mau, Jr. et al. ..................... 340/723 |
| 3,903,517 | 9/1975 | Hafner .................................. 340/731 |
| 3,911,420 | 10/1975 | Lampson . |
| 4,081,799 | 3/1978 | Granberg et al. . |
| 4,242,678 | 12/1980 | Somerville .......................... 340/721 |
| 4,290,064 | 9/1981 | Traster ................................. 340/723 |
| 4,358,788 | 11/1982 | Burrowes ............................ 340/723 |
| 4,367,533 | 1/1983 | Weiner ................................. 364/519 |
| 4,428,284 | 1/1984 | Thorne ................................. 400/121 |
| 4,450,483 | 5/1984 | Coviello ............................... 358/166 |
| 4,462,705 | 7/1984 | Hayashi et al. ..................... 400/121 |
| 4,508,463 | 4/1985 | Wang et al. ......................... 400/121 |
| 4,517,560 | 5/1985 | Murayama et al. ................. 340/735 |
| 4,555,701 | 11/1985 | Dahl et al. .......................... 340/728 |

FOREIGN PATENT DOCUMENTS

2213953 9/1973 Fed. Rep. of Germany .

Primary Examiner—Gerald L. Brigance
Assistant Examiner—Jeffery A. Brier
Attorney, Agent, or Firm—Bell, Seltzer, Park & Gibson

[57] ABSTRACT

A method and apparatus for displaying enhanced dot matrix characters is disclosed. Using stored sets of binary data elements which define the shape of the respective characters of a set, logical operations are performed to add additional binary data elements to provide the desired character. Characters are enhanced by either thickening the linear components thereof in a direction orthogonal to that of the linear components, or making them more dense by adding dots along the length of the linear components, or both. The stored data defines the character with a high density in the horizontal direction and a lower density in the vertical and diagonal directions. The characters are enhanced by defining a reference matrix which comprises a subset of the stored binary data elements, adding blank binary data elements to the defined reference matrix at locations between the stored binary data elements, and comparing portions of the reference matrix including the added blank binary data elements with corresponding portions of a predetermined matrix, and converting to a dot those added binary data elements that match the elements of the predetermined matrix. Characters may be enhanced in one manner but not another, and they may be enhanced along one or more linear components but less than all of them.

17 Claims, 18 Drawing Figures

_Fig-8_  _Fig-9_  _Fig-10_

_Fig-11_  _Fig-12_

_Fig-13_  _Fig-14_  _Fig-15_

_Fig-17_

METHOD AND APPARATUS FOR DISPLAYING ENHANCED DOT MATRIX CHARACTERS

This application is a continuation-in-part of application Ser. No. 695,997, filed Jan. 29, 1985, now U.S. Pat. No. 4,586,835, which is continuation-in-part of application Ser. No. 602,248, filed Apr. 20, 1984, now abandoned. This application is related to application Ser. No. 752,176, filed concurrently herewith. The contents of these applications are incorporated herein by reference.

FIELD OF THE INVENTION

The present invention relates to a method and apparatus for displaying dot matrix characters that may be selectively enhanced from stored sets of binary data elements representing either a dot or a blank. Logical operations are performed on the stored data elements to selectively enhance the character by generating additional binary data elements to increase the density or thicken the width of the linear components making up the character.

BACKGROUND OF THE INVENTION

In dot matrix printers, each character is comprised of a matrix of dots and blanks which together define the character. On close examination, the dots are arranged in a matrix of positions that are typically arranged in horizontal rows and vertical columns that are adjacent, parallel, and evenly spaced. The intersections of the rows and columns determine the locations of the dots and blanks, and the dots may overlap, depending upon the spacing between matrix intersections and dot diameter. Each dot or blank is represented in the apparatus by a binary data element with a binary 1 typically representing a dot and a binary 0 representing a blank. Data representing at least one entire character set is usually stored in the apparatus, and it includes numerals, upper and lower case letters, punctuation, and other commonly used symbols.

Depending upon the type of apparatus displaying the character, the quality of the character and the speed of printing may usually be selected as desired, within the capabilities of the display and associated data processing apparatus or computer. Each type of display, such as a dot matrix printer, electrostatic printer, ink jet printer, cathode-ray tube, etc., has unique physical constraints imposed by its mechanical or electrical capabilities. This usually affects the dot-to-dot spacing between locations in the matrix, as well as the speed at which the dots may be displayed. The associated data processing apparatus typically stores the sets of binary data elements defining the shape of the respective characters, performs any necessary logical operations on the stored data to provide the desired density or thickness of the displayed character, and governs the physical operations of the printer (or display).

It is desirable for a dot matrix printer to print characters in more than one density and thickness. It is also desirable to print at a high speed to provide a high volume output, with a lower quality printed character being acceptable, and to alternatively print a higher quality character, with a lower print speed being acceptable. Printing at a high speed with a lower quality printed character is commonly performed when a large volume of output is required, as in a data processing environment. A high speed of printing may be achieved by printing only a comparatively small number of the binary character data elements for each character spaced by about one dot width, resulting in the printing of characters of a lower print quality. On the other hand, high quality printed characters are preferred in a word processing environment or office environment, as well as the ability to selectively enlarge or enhance all or some of the characters. A higher quality character may be achieved by printing a relatively high number of the binary data elements for each character and spacing them by less than one dot width so that they overlap. Lower print speed and volume of output may result, but this is likely to meet the output demands of such an environment.

To print characters of different print qualities, it is necessary to provide data for each type of character quality. It is known to store a single set of binary data elements representing each character in a single print quality, and to duplicate by rote this basic data to obtain additional binary data elements for printing a character supposedly having a higher quality. This resulted in "stair-step" diagonals and seriously degraded the quality of the character and its legibility. These poor quality characters necessitated some type of smoothing operation if the stair-stepping effect was to be reduced, but these methods are usually very complex and expensive. Related problems include a destruction of the symmetry of both individual characters and groupings of characters to make words or phrases. For instance, the spacing between the linear components of a character may be degraded, and the base line for a character set may be lost, or widened to an unacceptable degree.

More specifically, some printers that provided characters of "improved" quality would print overlapping characters by using the same stored data to print the same character a second time one-half dot to the right. A second option was to print the same character a second time one-half dot below the first character. A third option was to combine both of the above methods and print the character still another time to the down and down right, thus printing four overlapping dots for each binary data element representing the stored character. The first option increased the density of the horizontal lines and added thickness to the vertical lines. The second option increased the density of the vertical lines and added thickness to the horizontal lines. The third option increased the density and added thickness to both the horizontal and the vertical lines. However, none of the options uniformly increased the density or thickness of the diagonal lines. Indeed, these options caused unsightly stair-stepping and in most cases aggravated the discontinuity of the diagonal lines. Thus, these options do not provide a satisfactory solution because of distortion, non-uniform increases in density, and the distracting stair-step effect.

An alternative to simply duplicating the stored data to enhance a single character is to store all of the binary data representing the multiplicity of sets of all improved quality characters. However, such increases in the amount of data storage are usually prohibitive in size and cost. And, low cost printers that employ inexpensive and relatively simple data processing components do not include the capabilities to store additional sets of enhanced characters, or process the complex algorithms which have been necessary in the past to enhance a character and smooth it to maintain its legibility.

The thickened, high density dot matrix characters of the present invention are displayed using a combination of the stored binary data elements representing the character and additional binary data elements derived from the stored binary data elements. The combined data defines a matrix of binary data elements, and dots are printed that correspond to the combination of the stored and generated data elements. To increase the density of a character overlapping dots may be selectively printed along the length of a vertical, diagonal, or horizontal linear components of the lines making up the character to make it appear darker or more dense. The lines may also be selectively thickened in a direction generally orthogonal to their linear direction to make them wider. Furthermore, to accommodate a variety of combinations of different print styles, characters may be thickened or have their density changed in all directions, or in one or more of the horizontal, vertical, and diagonal directions, and each may be done independently of the other.

The term diagonal refers to any line that is not either horizontal or vertical. Similarly, while reference is made to horizontal rows and vertical columns as a matter of convenience, the direction or designation of a line of binary data elements may be changed as necessary or desirable to suit a particular application. The invention is applicable to any data supplied, whether it represents characters, graphics, line drawings, geometrical shapes, etc., since the binary data is considered as a collection of lines.

Accordingly, it is an object of the present invention to provide a method and apparatus for displaying dot matrix characters that are selectively enhanced by thickening the character components or making them more dense, or both.

It is a further object of the present invention to provide a method and apparatus for displaying dot matrix characters that minimizes the cost and amount of data storage required to produce a wide variety of characters that have been selectively enhanced.

It is a further object of the present invention to provide a method and apparatus for displaying dot matrix characters of varying density and thickness from a single set of stored binary data elements representing a single character set.

It is a further object of the present invention to provide a method and apparatus for displaying enhanced dot matrix characters where the data for generating the character to be displayed is generated from a series of logical operations performed on a single set of stored character data elements.

It is a further object of the present invention to provide a method and apparatus for displaying dot matrix characters where the character density and thickness may each be individually determined for each character and individually determined for each of the horizontal, vertical, and diagonal components of each character.

It is a further object of the present invention to provide a method and apparatus for displaying dot matrix characters where the character and base line symmetry are preserved and are uniform for all character enhancements.

It is a further object of the present invention to provide a method and apparatus for displaying enhanced dot matrix characters that may be implemented with inexpensive data processing equipment for data handling and printer control and for minimizing the complexity and need for additional processing power and storage capabilities.

SUMMARY OF THE INVENTION

The present invention displays selectively enhanced dot matrix characters using binary data elements. Sets of binary data elements are stored, and each set defines the shape of a respective character which has a high density in the horizontal direction and a lower density in the vertical and diagonal directions. Logical operations are performed on a set of the stored binary data elements to generate additional binary data elements which either enhance the character by thickening it, or defining it more densely, or both in at least one of the vertical, diagonal, and horizontal directions. The additional binary data elements are used together with the stored binary data elements to display characters in which the linear components may be selectively thickened in a direction orthogonal to their linear direction and selectively made more dense along their length. Depending upon the nature of the character to be displayed, the data representing the stored character may be processed to selectively thicken and make more dense less than all of the vertical, horizontal, and diagonal linear components that together comprise the dot matrix character.

BRIEF DESCRIPTION OF THE DRAWINGS

The objects, features, and advantages of the invention are more fully understood by reading and understanding the following description of a preferred embodiment of the invention, with reference to the accompanying drawings.

DESCRIPTION OF THE INVENTION

Figure 1:
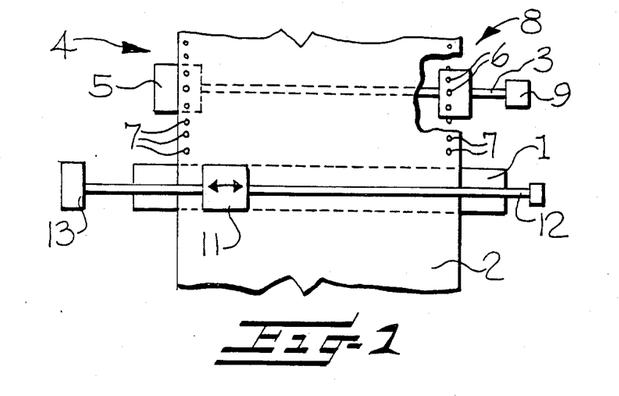
FIG. 1 is a schematic diagram illustrating a dot matrix printer of the type that is compatible with the present invention.
Figure 18:
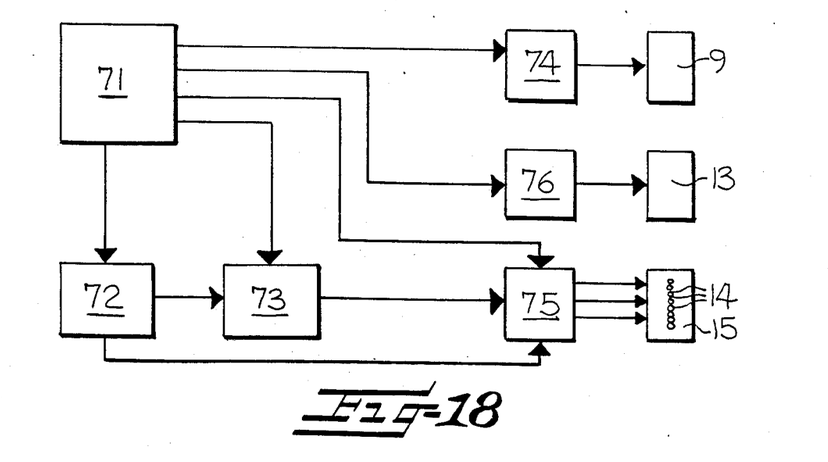
FIG. 18 illustrates diagrammatically apparatus for displaying enhanced dot matrix characters according to the present invention.

The invention is described as applied to a printer of the type illustrated diagrammatically in FIG. 1, although it is to be understood that the invention is compatible with other dot matrix display devices, such as those identified earlier. A dot matrix printer typcially includes a platen 1 over which a print medium 2 is moved by means of two tractor devices 3, 4. The print medium may be, for example, a continuous web of paper having holes 7 parallel to the edges thereof. Each tractor device includes a wheel or belt 5 provided with protruding pins 6 on the outer surface. The pins 6 engage the holes 7 formed in the web to provide a positive drive. The two tractor wheels 5 are mounted on a common shaft 8 which may be rotated as required by a motor 9 to advance the medium over the platen. The motor 9 is typically controlled by a print medium control, as illustrated in FIG. 18.

The printer includes a traversing print head 11 which is mounted on a support 12 extending over the platen 1 so that the medium 2 passes between the platen and the print head 11. The print head 11 can be moved along support 12 by motor 13 by way of a belt or rotating threaded shaft. The combined movement of the paper and the movement of the print head allows the print head to reach most any point on the surface of the medium 2.

Figure 2:
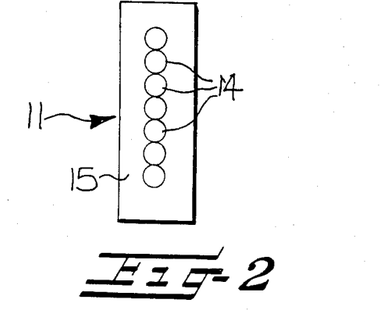
FIG. 2 is a schematic diagram illustrating the impacting end of a print head for a typical 7-wire dot matrix wire printer as may be used in the printer of FIG. 1.

The impacting portion of the print head 11, as illustrated in FIG. 2, is formed in part with a column of seven printing elements 14 arranged in a 1 by 7 vertically oriented matrix and supported in a body portion 15. The elements 14 are typically wires which can be selectively moved axially by, for example, an electromagnet. Each wire is individually linked to an electromagnet so that it may be individually fired as necessary or desirable in timed relation with the movement of the print head 11. The print wires press an inked ribbon onto the medium 2 to perform the printing operation. As the print head 11 traverses the width of the paper along the length of the support 12, the data defining the characters is provided to the electromagnets controlling the print wires in a coordinated, time sequence to fire them as the print head passes through the columns defining the character.

Figure 3:
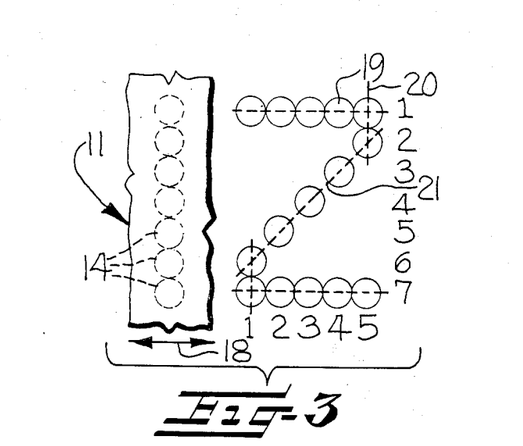
FIG. 3 is a schematic diagram illustrating the relative movement of the print head of FIG. 2 to print a lower quality dot matrix character as illustrated.

The dotted lines 19–21 in FIG. 3 help illustrate, respectively, the horizontal, vertical and diagonal linear components of the character. All characters may be defined by such components, with the diagonal component being any linear component that is not horizontal or vertical. These component lines are not displayed when the character is printed. For the purposes of this application, a full diagonal line is one that falls midway between a horizontal line and a vertical line, i.e. at about a 45° angle. A half diagonal line is one that falls midway between a full diagonal line and either a horizontal line or a vertical line, i.e. at about 22½ displaced from either the horizontal line or the vertical line.

Referring still to FIG. 3, as the print head moves laterally, as shown by arrow 18, individual wires in the print head are fired at appropriate times to print dots that define the adjacent vertical columns of the character. As the print head 11 moves from left to right the elements 14 are selectively operated to print the complete left vertical feature of the character first, then to print the succeeding vertical features column by column, and finally to print the last right vertical feature as the print head moves across the print medium. (The description of the invention refers to processing the data and printing the characters from left to right, but it is to be understood that the data may be processed in a different order and the characters may be printed from right to left.) The size and position of the character and the distance between adjacent dots in the horizontal direction is controlled by varying the speed of movement of the head in relation to the timing of the operation of the printing elements. The spacing of the dots in the vertical direction corresponds to the spacing of the printing elements 14. Specifically, as the print head 11 reaches the location of column 1 for the letter Z as illustrated in FIG. 3, print wires 1, 6, and 7 are advanced to strike the ribbon against the print medium, printing the three dots for column 1, and are then retracted. As the print head approaches column 2, print wires 1, 5, and 7 are advanced, and this pattern continues as the print head moves through the columns 1 through 5 to print the entire character as illustrated.

In a practical embodiment of the invention, each of the printing elements 14 in the print head 11 prints a circular dot which has a diameter of about 1/60 inch, and the spacing between the centers of adjacent elements is substantially equal to the diameter of each dot so that, in the vertical direction, adjacent printed dots will just touch. To print a character of a lower quality at a high speed, the speed of movement of the print head 11 across the print medium 2 and the frequency of operation of the printing elements 14 are coordinated so that adjacent columns of dots in the horizontal direction have a spacing of 1/60 inch between centers. Such a character is illustrated in FIG. 3.

Figure 8:
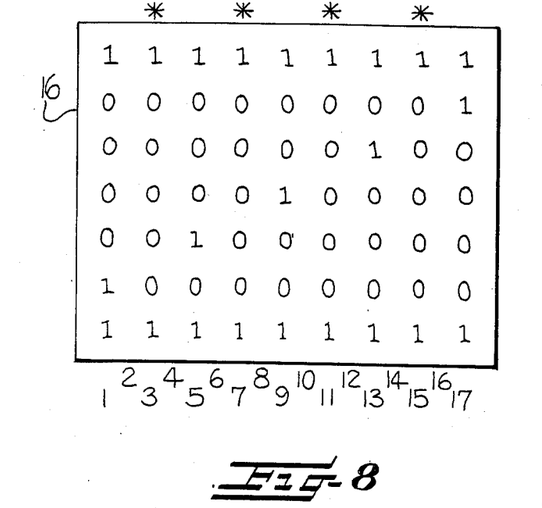
FIG. 8 illustrates diagrammatically a set of stored binary data elements defining the character of FIG. 7 with the data in the vertical and diagonal directions being of a lower density and the data in the horizontal direction being of a higher density.

To print characters, it is necessary to store or have otherwise available sets of binary data elements, with each set defining the shape of a respective character. The binary data elements are processed as necessary to print the dots defining the character. FIG. 8 illustrates the logical ones and logical zeros stored in storage device 16 that represent the binary data elements defining the shape of the letter Z. There are nine vertical columns and seven horizontal rows defining each character with the nine vertical columns being designated by the odd numbers 1, 3, 5, 7, 9, 11, 13, 15 and 17. The even numbers 2, 4, 6, 8, 10, 12, 14 and 16 represent the columns of blank binary data elements that are added to enhance the character, as described later herein, but they are not a part of the stored binary data elements.

Each character is defined with a high density in the horizontal direction and a lower density in the vertical and diagonal directions. The data from the storage device 16 is read out column-by-column, processed as necessary, and the processed data from each column is used to sequentially control the column of printing elements 14 in the print head 11 as it moves across the printing medium. When a binary 1 is stored in a data storage location, the corresponding printing element is operated to imprint a dot on the printing medium, and when a binary 0 is stored the printing element is not operated. To print a data processing or lower quality character every column of data is considered, but consecutive dots in a row are eliminated and not printed. For example, for the character shown in FIG. 3, which has a lower print density in the horizontal, vertical, and diagonal directions, the data elements in vertical columns 3, 7, 11 and 15 of the storage device 16 are not used. Thus, for this example, the data in the columns designated by an asterisk at the top are deleted and only the remaining odd numbered columns 1, 5, 9, 13 and 17 are used to print the character.

As noted earlier, the character is made up of horizontal, vertical, and diagonal components, as reflected by FIG. 3. According to the present invention, each character is thickened by increasing the width of a linear component in a direction generally orthogonal to its length. The density of each of the linear components is increased to darken the appearance of the character by printing dots between the dots of the lower quality character, as illustrated in FIG. 3.

Figure 4:
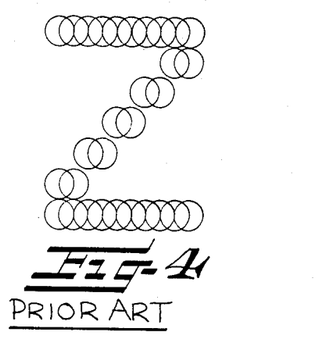
FIG. 4 illustrates the character of FIG. 3 with the identical character printed a second time one-half dot to the right, as was done in the prior art.

FIG. 4 illustrates the character of FIG. 3 with the same data printed a second time to duplicate the character one-half dot to the right of the first character. This increases the density of the horizontal linear components of the character and adds thickness to the vertical linear components of the character. However, it does not increase the density of the diagonal or vertical linear components thereof, nor does it thicken the horizontal or diagonal linear components thereof. Moreover, it aggravates the stair-stepping problems and highlights the lack of uniform density and thickness of the diagonal linear components.

Figure 5:
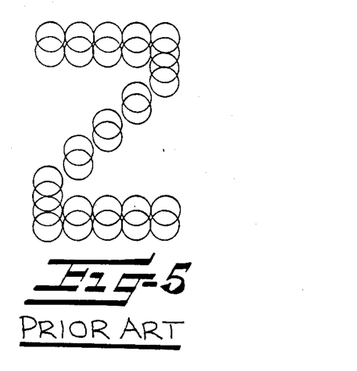
FIG. 5 illustrates the character of FIG. 3 with the identical character printed a second time one-half dot below, as was done in the prior art.

FIG. 5 illustrates the character of FIG. 3 with the same data printed a second time to duplicate the character one-half dot below the first printing. This increases the density of the vertical components of the character and adds thickness to the horizontal components of the character. It does not increase the density of the horizontal or diagonal components, nor does it increase the thickness of the vertical or diagonal components. And, as before, it aggravates the stair-stepping problem and again highlights the lack of uniform density and thickness of the diagonal components.

Figure 6:
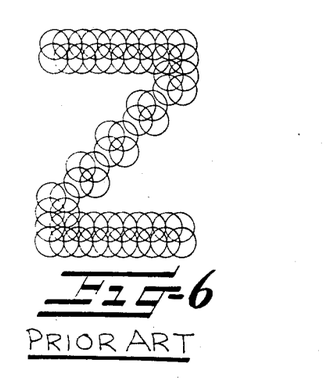
FIG. 6 illustrates the character of FIG. 3 with the identical character printed one-half dot below, one-half dot to the right, and again to the down and downright, as was done in the prior art

FIG. 6 illustrates the character of FIG. 3 which combines the options illustrated in FIGS. 4 and 5 and further prints the same data a fourth time to duplicate each dot down and right from its original position. This increases the density and thickens the horizontal and vertical components, but also aggravates the stair-step problem of the diagonal components and highlights the lack of uniform density and thickness of the diagonal components. In none of the instances illustrated in FIGS. 4-6 are the stored binary data elements logically processed to generate additional binary data elements to enhance the character.

Figure 7:
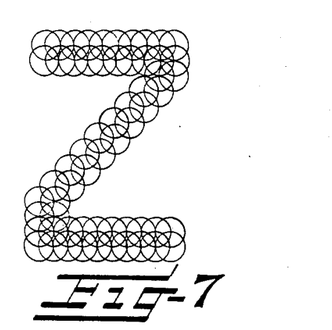
FIG. 7 illustrates a character enhanced according to the present invention.

FIG. 7 illustrates the character of FIG. 3 fully enhanced according to the present invention. The density is uniformly increased for each of the horizontal, vertical, and diagonal components of the character. Similarly, each of the linear components is uniformly thickened by increasing the width of the component in a direction generally orthogonal to its length. The data for printing such a character is a combination of the stored binary data elements and additional binary data elements derived therefrom.

While a specific embodiment of the invention is described in connection with a seven wire print head for printing a typical 5 column by 7 row character, it is to be understood that different print mechanisms and characters are compatible with the invention. And, depending upon the physical limitations of each printer as to size and speed, it may be necessary for the print head to make multiple passes, or move at lower translational speeds, to print an enhanced character.

As noted earlier, the print head is controlled by binary data elements which control the operation of the individual print wires as the print head moves across the print medium. These binary data elements are logically processed as necessary to define a matrix of binary data elements to print the desired character. Beginning with the binary data elements as stored in memory 16, where the character has a high density in the horizontal direction and a lower density in the vertical and diagonal directions, logical operations are performed on the stored binary data elements to generate additional binary data elements. The added binary data elements are assumed to be blanks, and selected ones are converted to a dot. The additional binary data elements are then combined with stored binary data elements to together display the character in the enhanced state with the linear components thereof being thickened and made more dense as desirable.

Figures 9, 10:
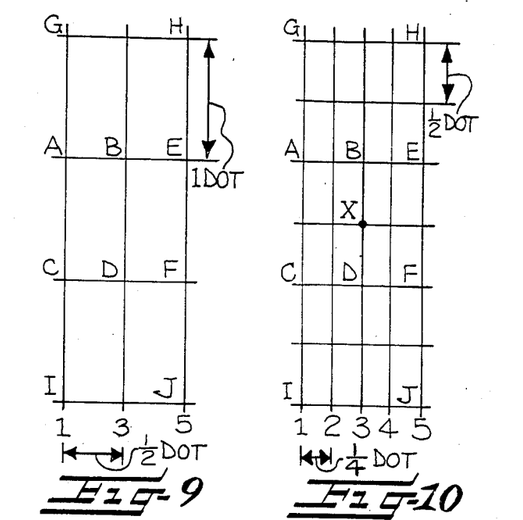
FIG. 9 illustrates diagrammatically a reference matrix to enhance a character according to the present invention. The ten matrix positions A–J defined by the intersections of the rows and columns correspond to the stored binary data elements defining the shape of the character. The horizontal rows are each vertically spaced by one dot width and the vertical columns are each spaced by one-half dot width.
FIGS. 10, 11 and 12 illustrate diagrammatically reference matrices with additional binary data elements added at locations between the locations of the already stored binary data elements. The matrix positions A–J defined by the intersections of the rows and columns correspond to the stored binary data elements defining the shape of a character. The unlabeled matrix positions correspond to the added binary data elements. The horizontal rows are vertically spaced by one-half dot width and the vertical columns are spaced by one-quarter dot width.
Figure 11:
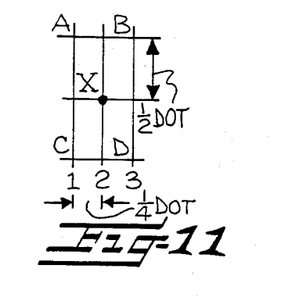
Figure 12:
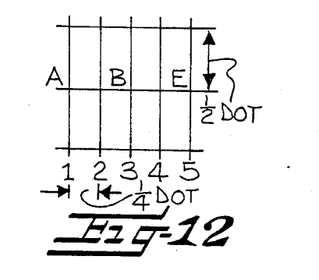

In performing the logical operations to generate the additional binary data elements, a reference matrix, such as illustrated in FIG. 9, is defined which substantially comprises a subset of the set of the binary data elements stored in the storage device 16. The horizontal rows of the reference matrix are spaced by 1 dot width and the vertical columns are spaced by one-half dot width. The intersections, labelled A–J represent the ten stored binary data elements needed for the present invention. Blank binary data elements are then added to the reference matrix at locations horizontally, vertically and diagonally between the locations of adjacent stored binary data elements, such as illustrated in FIGS. 10–12. The horizontal rows are spaced by one-half dot width and the vertical columns are spaced by one-fourth dot width. To determine whether the added binary data elements are to be converted to a dot, the reference matrix with the added binary data elements is compared with a predetermined matrix, and to the extent that the reference matrix with the added binary data elements matches the predetermined matrix, the added binary data elements are converted to a dot. The data is then printed.

A. First Pass Printing

This invention requires two passes of the print head to print the enhanced character. The first pass prints a portion of the dots, and the paper is incremented vertically by one-half dot, and then the second pass prints the remainder of the dots. The first pass prints a character with the vertical and diagonal components thickened and the density increased for the horizontal components, as is illustrated in FIG. 4.

The first pass utilizes selected stored binary data elements from the storage device 16, with one logical operation. Printing one column at a time, the preceding vertical column of stored binary data elements from memory device 16 is logically ORed with the current vertical column of stored binary data elements and the resulting data is printed. This is the equivalent of printing the character as it is printed normally, as in FIG. 1, and then printing the character again one-half dot to the right, as in FIG. 4. This first pass is typically printed at one-half the normal printing speed so that the dots can be printed to overlap by one-half dot. The logical operation of ORing together adjacent columns is represented as follows:

$$Ca(i) = 0 \qquad \text{MATRIX 1}$$

where i = Even column numbers $$Ca(i) = C(i) + C(i-2) \qquad \text{MATRIX 2}$$

where i = Odd column numbers
where
Ca(i) = Column of binary data elements to be printed
C(i) = Column of stored binary data elements.

As noted earlier, since the first pass utilizes only stored binary data elements, those positions representing derived binary elements, i.e. the binary data elements represented by the even numbered columns, are all deemed to be blanks and are represented by logical zero's. It is assumed that the two adjacent columns on the left and right boundaries of the matrix of stored binary data elements are columns of logical zeros representing blanks.

B. Second Pass Printing

The second pass required to print the character utilizes data that is derived from the stored binary data elements. It is also printed at half speed with a column spacing of one-half dot width.

FIG. 9 illustrates diagrammatically a sample reference matrix that substantially comprises a subset of the set of stored binary data elements. The intersections of the rows and columns define twelve matrix positions, but only the ten matrix positions labeled A–J are necessary to practice the present invention.

FIGS. 10, 11 and 12 illustrate diagrammatically the reference matrix of FIG. 9 with additional binary data elements added at locations between adjacent stored binary data elements, as represented by the unlabeled intersections. A row has been added between each of the existing rows and a column has been added between each of the existing columns. The spacing between each of the original rows and added rows is one-half dot width, and the spacing between each of the original columns and added columns is one-fourth dot width. Thus, the size of the reference matrix does not change, but the density of the data has been increased vertically, horizontally, and diagonally. The intersections of the added columns with the existing rows and added rows, and the added rows with the existing columns and added columns, represent the added blank binary data elements which may later be converted to a dot.

Different stored binary data elements are used at the various positions in the reference matrix as the reference matrix is defined for different portions of the stored binary data elements. Since the reference matrix is defined for different portions of the stored binary data elements representing the stored character, some positions in the reference may be outside the bounds of the stored binary data and, thus, represent binary data elements that form a portion of the vertical blank space between characters or the horizontal blank space between lines. Positions in the reference matrix representing these binary data elements outside the area defined by the stored binary data elements are designated as blanks, and specifically the two columns to the left and two columns to the right of the stored binary data.

To increase the density for the half diagonal lines, the status of the added blank binary data elements is determined by comparing the reference matrix including the added blank binary data elements to a predetermined matrix represented by the following:

$$Cb(i) = A \cdot D \cdot \overline{B} \cdot \overline{C} + \overline{A} \cdot \overline{D} \cdot B \cdot C \qquad \text{MATRIX 3}$$

where
i = Even column numbers
Cb(i) = Column of processed binary data elements.

This expression states, using Boolean logic, that the binary data elements in a particular column, such as column 2, are converted to a dot (binary 1) if positions A and D are dots and positions B and C are blanks (binary 0), or if positions A and D are blanks and positions B and C are dots. Otherwise, it remains a blank, unless another predetermined matrix causes it to be converted to a dot. Applying this predetermined matrix to the reference matrix including the added blank binary data elements of FIG. 11 for the upper right portion of the data in FIG. 8, since positions A and B are represented by dots and positions C and D are represented by blanks, position X remains a blank. This predetermined matrix is applied for each blank binary data element in the column, and may be done by processing the entire column of binary data elements simultaneously, or in parallel.

To increase the density for the full diagonal and vertical lines, and using the odd numbered columns, the status (logical 1 or logical 0) of the added blank binary data elements in the odd numbered columns are derived for location X of FIG. 10 using the reference matrix illustrated. The predetermined matrix is represented by the following:

$$Cc(i) = \overline{B} \cdot \overline{D} + \overline{B} \cdot \overline{D}((A \cdot F) \; (\overline{G} + \overline{C}) \; (E + \overline{J}) + (C \cdot E)$$
$$(\overline{A} + \overline{I}) \; (\overline{H} + \overline{F}))$$

where Cc(i) = Columns of processed binary data elements. The second pass also adds thickness to the horizontal lines of the character printing after the paper has been vertically advanced by one-half dot width. A blank binary data element is recognized as being part of a horizontal line if a dot is stored in either of the horizontally adjacent positions. Thus, if there is a dot on either side of the dot in question, it is deemed part of a horizontal line. Referring to FIG. 12, the logical operation to recognize a dot as being part of a horizontal line is represented by the following:

$$\text{Horizontal line} = B \cdot (A + E)$$

The dots that are part of the horizontal line are always printed in the odd columns since the requisite data is already stored with the horizontal lines having a higher density. Thus, the two preceding matrices may be combined to define a reference matrix represented as follows:

$$Cd(i) = B(A+E+D) + \overline{B} \cdot \overline{D} \cdot ((A \cdot F) \ (\overline{G} + \overline{C})$$
$$(\overline{E} + \overline{J}) + (C \cdot E) \ (\overline{A} + \overline{I}) \cdot (\overline{H} + \overline{F}))$$      MATRIX 4 where
i = Odd column numbers
Cd(i) = Columns of processed binary data elements
This matrix will increase the density for the diagonal and vertical lines and thicken the horizontal lines.

To thicken the horizontal lines during the second pass, all of the added binary data elements are printed again one-half dot position to the right. This is done in two steps. First, the last odd column of binary data elements is logically ORed with the current odd column of binary data elements. Second, the last even column of binary data elements is logically ORed with the current even column of binary data elements. Such a reference matrix is represented as follows:

$$Ce(i) = Cb(i) + Cb(i-2)$$      MATRIX 5 where
i = even column numbers
$Ce(i) = Cd(i) + Cd(i-Z)$
  where
  i = Odd column numbers
  Ce(i) = Columns of processed binary data elements.

When thickness is added to a character by converting adjacent binary data elements to a dot at the intersection of a horizontal line and a half diagonal line, more binary data elements may be converted to a dot than are necessary. This increases the density of the linear components beyond that desired and, depending upon the mechanical and electrical characteristics of the printer, it may not be possible to print the overlapping dots at the spacing indicated. Thus, undesired consecutive dots are eliminated by comparing the reference matrix with the added blank binary data elements with a predetermined matrix represented by the following:

$$Cf(i) = Ce(i) \cdot \overline{Cf(i-1)}$$      MATRIX 6 where Cf(i) = Columns of binary data elements to be printed.

Figure 13:
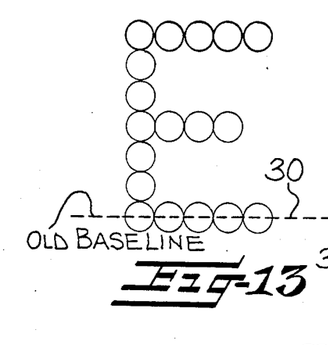
FIGS. 13–15 illustrate how the base line is maintained for a dot matrix character enhanced according to the present invention.
Figures 14, 15:
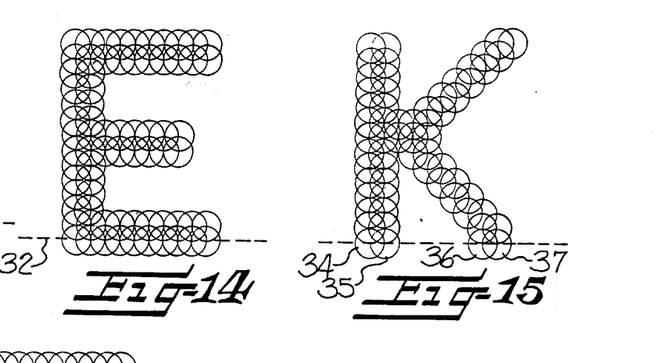

The bottom line of a character is referred to as the base line and is the lowermost horizontal line of the character. See dotted line 30 in FIG. 13. Since all of the horizontal lines of a character enhanced according to the present invention are thickened downwardly, those characters having a horizontal line at the base line are extended below the base line by half a dot, as illustrated by a comparison of the dotted line 30 of FIG. 13 with the dotted line 32 in FIG. 14. To maintain the base line for all enhanced characters, all vertical and diagonal lines that contact the base line are extended downwards by half a dot, as illustrated in FIG. 15 by adding the dots 34-37. To extend the base line, each column is logically ANDed with a hypothetical row of logical 1's (dots) immediately below the stored binary data elements as represented in memory device 16.

Figure 16:
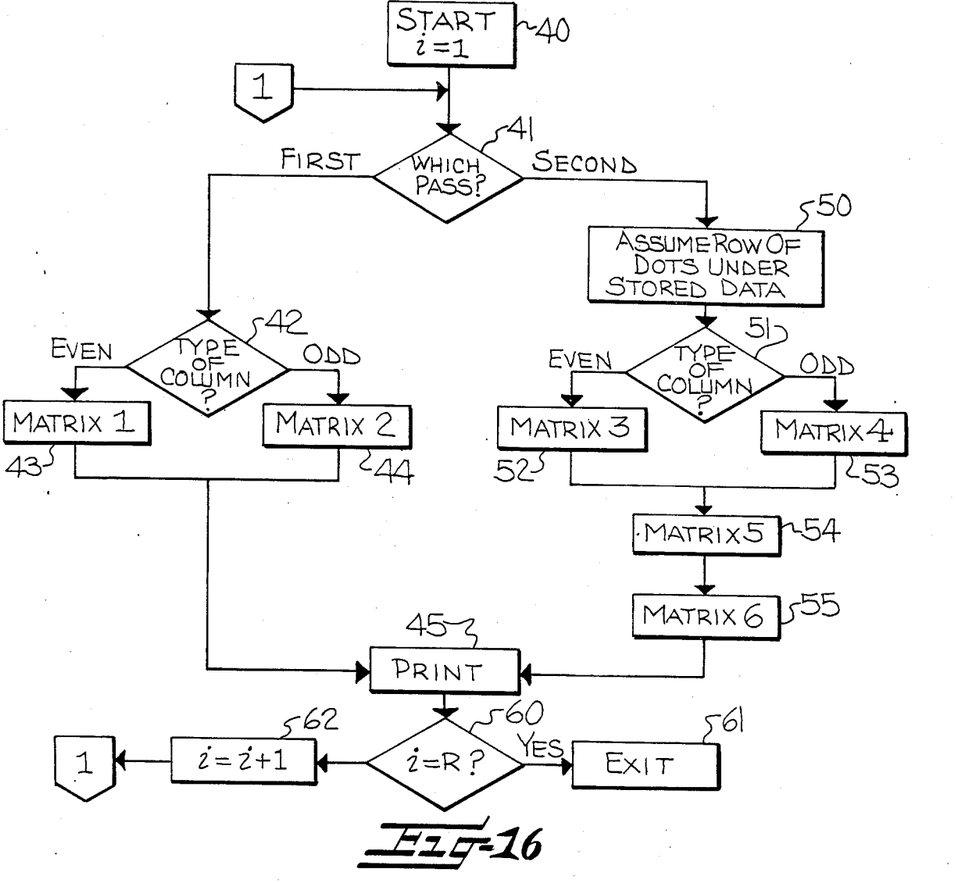
FIG. 16 is a flow chart representing the logical operations performed in accordance with the invention to enhance characters.

FIG. 16 is a flow chart representing the logical operations performed in accordance with the invention to print enhanced characters that are thickened and have an increased density. The character is derived from the binary data elements stored in memory device 16. At step 40 the sequencing parameter which causes the program to treat each column of binary data elements C(i) is set to its initial value. At step 41 the pass being made is determined as either the first pass, which uses only the stored binary data elements, or the second pass, which uses binary data elements that are derived from the stored binary data elements.

For the first pass, the type of column is determined as either an even column, representing added binary data elements (all of which are assumed to be blanks on the first pass) or an odd column, representing stored binary data elements. The columns of the reference matrix including the added blank binary data elements are then compared with Matrices 1-2 at steps 43 and 44 to determine which binary data elements are to be printed, as indicated at step 45.

Returning to step 41 for the second pass, at step 50 a row of binary data elements representing dots is assumed to be immediately below the character base line as represented by the stored binary data elements to provide the new base line 32 for the enhanced character as illustrated in FIGS. 14 and 15. At step 51 the type of column is determined as being even or odd. The columns of the reference matrix including the added blank binary data elements are then compared with matrices 3-6 to determine whether or not the added binary data elements should be converted to a dot or remain a blank, as represented by steps 52-55. This process is repeated on a column-by-column basis for each pass, as determined by a counting loop designated at steps 60-62. When all R columns have been printed, the routine ends.

Figure 17:
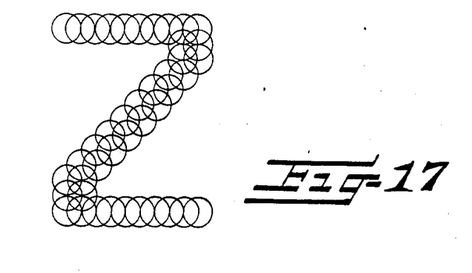
FIG. 17 illustrates an alternate enhanced character.

The character of FIG. 17 has a high density in the horizontal, vertical and diagonal directions, with the vertical and diagonal linear components being thickened but not the horizontal linear components. Thus, using the same sets of stored binary data elements which define characters having a high density in the horizontal direction and a lower density in the vertical and diagonal directions (i.e., as in FIG. 8), such a character may be printed by following the logical operations described in the flow chart of FIG. 16, but by eliminating step 50 of assuming a row of dots under the stored data and logically ANDing the assumed row with each calculated column of dots, and by modifying the predetermined Matrix 4 to be represented as follows:

$$Cg(i) = B \cdot D + \overline{B} \cdot \overline{D} \cdot ((A \cdot F) \ (\overline{G} + \overline{C}) \ (\overline{E} + \overline{J}) + (C \cdot E)$$
$$(\overline{A} + \overline{I}) \ (\overline{H} + \overline{F}))$$      MATRIX 4A where
i = Odd column numbers
Cg(i) = Column of processed binary data elements. (Same as Cc(i))
Other variations may be printed by modifying the various predetermined matricies or eliminating certain ones.

FIG. 18 illustrates diagrammatically apparatus for displaying enhanced dot matrix characters that may be selectively thickened or selectively made more dense in accordance with the present invention. The circuitry includes a control unit 71, a character data storage element 72, a logic unit 73, a print medium controller 74 connected to the tractor motor 9, a print head movement controller 76 attached to the print head motor 13, and a print head actuator 75 connected to the print head 15 to control the actuation of each of the individual print wires 14.

The sets of binary data elements are stored in the character data storage means 72, which includes a plurality of storage devices 16, as referred to in FIG. 9. Binary data representing either a dot or a blank in a matrix of positions arranged in horizontal rows and vertical columns is stored in each of the storage devices 16, and together the stored data represents a character.

The logic unit 73 includes means for performing logical operations on the selected sets of binary data elements representing the various characters. It may, among other things, address the appropriate data representing the desired character, read out the data representing the desired character, define a reference matrix for each character, expand the reference matrix by adding blank binary data elements, compare selected portions of the expanded reference matrix with a predetermined matrix, and convert those binary data elements to a dot that match the predetermined matrix. As instructed by the control unit, this will result in characters which are selectively thickened and made more dense as desired by the operator of the printer.

The control unit 71 includes means governing the data processing and mechanical functions of the printer, coordinates their respective operations, and may further communicate with a host computer. Management of the data processing may include control of the character data storage means 72 and the logic unit 73. Control of the mechanical operation of the printer may include control of the print medium or paper, print head movement, and the actuation of the wires in the print head.

The print medium controller 74 provides signals to the motor 9 to control the movement of the print medium 2 over the platen and past the print head.

The print head movement controller 76 provides signals to the print head motor 13 to control the translational movement of the print head across the print medium 2.

The print head actuator 75 provides signals to actuate the individual printing elements 14 of the print head 11 under control of signals from the control unit 71 and in accordance with the data signals from the data storage unit 72 and from logic unit 73. The control unit 71 typically coordinates the flow of data to the print head actuator with the physical movement of the print head.

While the invention has been described with respect to a specific dot matrix printer, it is to be understood that it may be used in connection with any device that will display a dot matrix character.

What is claimed is:

1. A method of displaying enhanced dot matrix characters comprised of selected binary data elements representing either a dot or a blank in a matrix of positions arranged in horizontal row and vertical columns, the method comprising:
   (a) storing sets of binary data elements, each set defining a respective character having horizontal linear components of a higher density and vertical and diagonal linear components of a lower density;
   (b) performing logical operations on a set of the stored binary data elements to generate associated additional binary data elements which selectively enhance the respective character; and
   (c) selectively using at least some of the generated associated additional binary data elements together with the stored binary data elements to display characters in which at least one of the vertical, diagonal and horizontal linear components thereof are enhanced along the length thereof.

2. The method of claim 1 wherein the step of performing logical operations on a set of the stored binary elements to generate associated additional binary data elements comprises generating additioanl binary data elements to selectively increase the thickness of at least one of the vertical, diagonal and horizontal linear components thereof in a direction generally orthogonal to the linear direction thereof.

3. The method of claim 1 wherein the step of performing logical operations on a set of the stored binary elements to generate associated additioanl binary data elements comprises generating additional binary data elements to selectively increase the density of at least one of the vertical and diagonal linear components thereof, and to maintain the higher density of the horizontal linear components thereof.

4. The method of claim 1 wherein the step of performing logical operations of a set of the stored binary elements to generate associated additional binary data elements comprises
   (a) defining a reference matrix substantially comprising a subset of the set of stored binary data elements;
   (b) adding blank binary data elements to the defined reference matrix between the binary data elements of the set of stored binary data elements; and
   (c) comparing selected portions of the reference matrix including the added binary data elements with corresponding selected portions of a predetermined matrix and converting selected added binary data elements to a dot when the reference matrix matches the predetermined matrix.

5. The method of claim 4 wherein the step of comparing selected portions of the reference matrix including the added binary data elements with corresponding selected portioins of the predetermined matrix comprises comparing the selected portions of the reference matrix including the added binary data elements with a predetermined matrix for defining the binary state of the added binary data elements increasing the density of the half-diagonal linear components of the character.

6. The method of claim 4 wherein the step of comparing selected portions of the reference matrix including the added binary data elements with corresponding selected portions of the predetermined matrix comprises comparing the selected portions of the reference matrix including the added binary data elements with a predetermined matrix for defining the binary state of the added binary data elements thickening the character in the horizontal direction and increasing the density of the diagonal and vertical linear components of the character.

7. The method of claim 4 wherein the step of comparing selected portions of the reference matrix including the added binary data elements with corresponding selected portions of the predetermined matrix comprises comparing the selected portions of the reference matrix including the added binary data elements with a predetermined matrix for defining the binary state of the added binary data elements to eliminate selected consecutive horizontal dots at the intersection of a half-diagonal and a horizontal line.

8. The method of claim 4 wherein the step of comparing selected portions of the reference matrix including the added binary data elements with corresponding selected portions of the predetermined matrix comprises comparing the selected portions of the reference matrix including the added binary data elements with a predetermined matrix for defining the binary state of the added binary data elements extending downwardly one binary data element the vertical and diagonal components of the character that lie on the baseline to extend the charcter one half dot below the baseline.

9. The method of claim 4 wherein the step of adding blank binary data elements to the reference matrix comprises adding predetermined binary data elements to the reference matrix at locations generally below the corresponding binary data element locations representing the stored character, so that the character is thickened downwardly.

10. Apparatus for displaying thickened, high density dot matrix characters comprised of selected binary data elements representing either a dot or a blank in a matrix of positions arranged in horizontal rows and vertical columns, the apparatus comprising:
   (a) means for storing sets of binary data elements, each set defining a respective character having horizontal linear components of a high density and vertical and diagonal linear components of a lower density;
   (b) means for performing logical operations on a set of the stored binary data elements to generate associated additional binary data elements which selectively enhance the respective character by thickening it and defining it more densely in the vertical, diagonal and horizontal directions; and
   (c) means for selectively using at least some of the generated associated additional binary data elements together with the stored binary data elements to display characters in which the vertical, diagonal and horizontal linear components thereof are selectively thickened in a direction generally orthogonal to the linear direction thereof, and selectively made more dense along the length thereof.

11. The apparatus of claim 10 wherein the means for performing logical operations on a set of the stored binary elements to generate associated additional binary data elements comprises means for generating additional binary data elements to selectively increases the thickness of the vertical, diagonal and horizontal linear components thereof in a direction generally orthogonal to the linear direction thereof, and to selectively increase the density of the vertical and diagonal linear components thereof, and to maintain the density of the horizontal linear components thereof.

12. The apparatus of claim 10 wherein the means for performing logical operations on a set of the stored binary elements to generate associated additional binary data elements comprises
   (a) means for defining a reference matrix substantially comprising a subset of the set of stored binary data elements;
   (b) means for adding blank binary data elements to the defined reference matrix between the binary data elements of the set of stored binary data elements; and
   (c) means for comparing selected portions of the reference matrix including the added binary data elements with corresponding selected portions of a predetermined matrix and converted selected added binary data elements to a dot when the reference matrix matches the predetermined matrix.

13. Apparatus for displaying enhanced dot matrix characters comprised of selected binary data elements representing either a dot or a blank in a matrix of positions arranged in horizontal rows and vertical columns, the apparatus comprising:
   (a) means for storing sets of binary data elements, each set defining a respective character having horizontal linear components of a higher density and vertical and diagonal linear components of a lower density;
   (b) means for performing logical operations on a set of the stored binary data elements to generate associated additional binary data elements which selectively enhance the respective character; and
   (c) means for selectively using at least some of the generated associated additional binary data elements together with the stored binary data elements to display characters in which at least one of the vertical, diagonal and horizontal linear components thereof are enhanced along the length thereof.

14. The apparatus of claim 13 wherein the means for performing logical operations on a set of the stored binary elements to generate associated additional binary data elements comprises means for generating additional binary data elements to selectively increase the thickness of at least one of the vertical, diagonal and horizontal linear components thereof in a direction generally orthogonal to the linear direction thereof.

15. The apparatus of claim 13 wherein the means for performing logical operations on a set of the stored binary elements to generate associated additional binary data elements comprises means for generating additional binary data elements to selectively increase the density of at least one of the vertical and diagonal linear components thereof, and to maintain the density of the horizontal linear components thereof.

16. The apparatus of claim 13 wherein the means for performing logical operations on a set of the stored binary elements to generate associated additional binary data elements comprises means for generating additional binary data elements to selectively increase the thickness of at least one of the vertical, diagonal and horizontal linear components thereof in a direction generally orthogonal to the linear direction thereof, and to selectively increase the density of at least one of the vertical and diagonal linear components thereof, and to maintain the density of the horizontal linear components thereof.

17. The apparatus of claim 13 wherein the means for performing logical operations on a set of the stored binary elements to generate associated additional binary data elements comprises
   (a) means for defining a reference matrix substantially comprising a subset of the set of stored binary data elements;
   (b) means for adding blank binary data elements to the defined reference matrix between the binary data elements of the set of stored binary data elements; and
   (c) means for comparing selected portions of the reference matrix including the added binary data elements with corresponding selected portions of a predetermined matrix and converted selected added binary data elements to a dot when the reference matrix matches the predetermined matrix.

* * * * *

UNITED STATES PATENT AND TRADEMARK OFFICE
CERTIFICATE OF CORRECTION

PATENT NO. : 4,703,323

DATED : 10-27-87

INVENTOR(S) : Demetrios Troupes; Randall W. Alexander

It is certified that error appears in the above-identified patent and that said Letters Patent is hereby corrected as shown below:

Col. 1, line 50: after the "dotto-dot" should read -- dot-to-dot -- .

Col. 6, line 10: after about "22½" should read -- 22½° -- .

Col. 8, line 66: after diagonal "compornments" should read -- components -- .

Col. 10, line 46: equation reads

"$Cc(i) = \overline{B} \cdot \overline{D} + \overline{B} \cdot \overline{D}((A \cdot F) \cdot (\overline{G+C}) \cdot (\overline{E+J}) + (C \cdot E) \cdot (\overline{A+I}) \cdot (\overline{H+F}))$"

should read

-- $Cc(i) = B \cdot D + \overline{B} \cdot \overline{D}((A \cdot F) \cdot (\overline{G+C}) \cdot (\overline{E+J}) + (C \cdot E) \cdot (\overline{A+I}) \cdot (\overline{H+F}))$ --

Col. 11, line 23: equation reads "$Ce(i)=Cd(i)+Cd(i-Z)$" should read -- $Ce(i)=Cd(i)+Cd(i-2)$ -- .

Col. 13, line 48: after horizontal "row" should read -- rows -- .

Signed and Sealed this

Tenth Day of May, 1988

Attest:

DONALD J. QUIGG

Attesting Officer

Commissioner of Patents and Trademarks